United States Patent Office 3,303,753
Patented Feb. 14, 1967

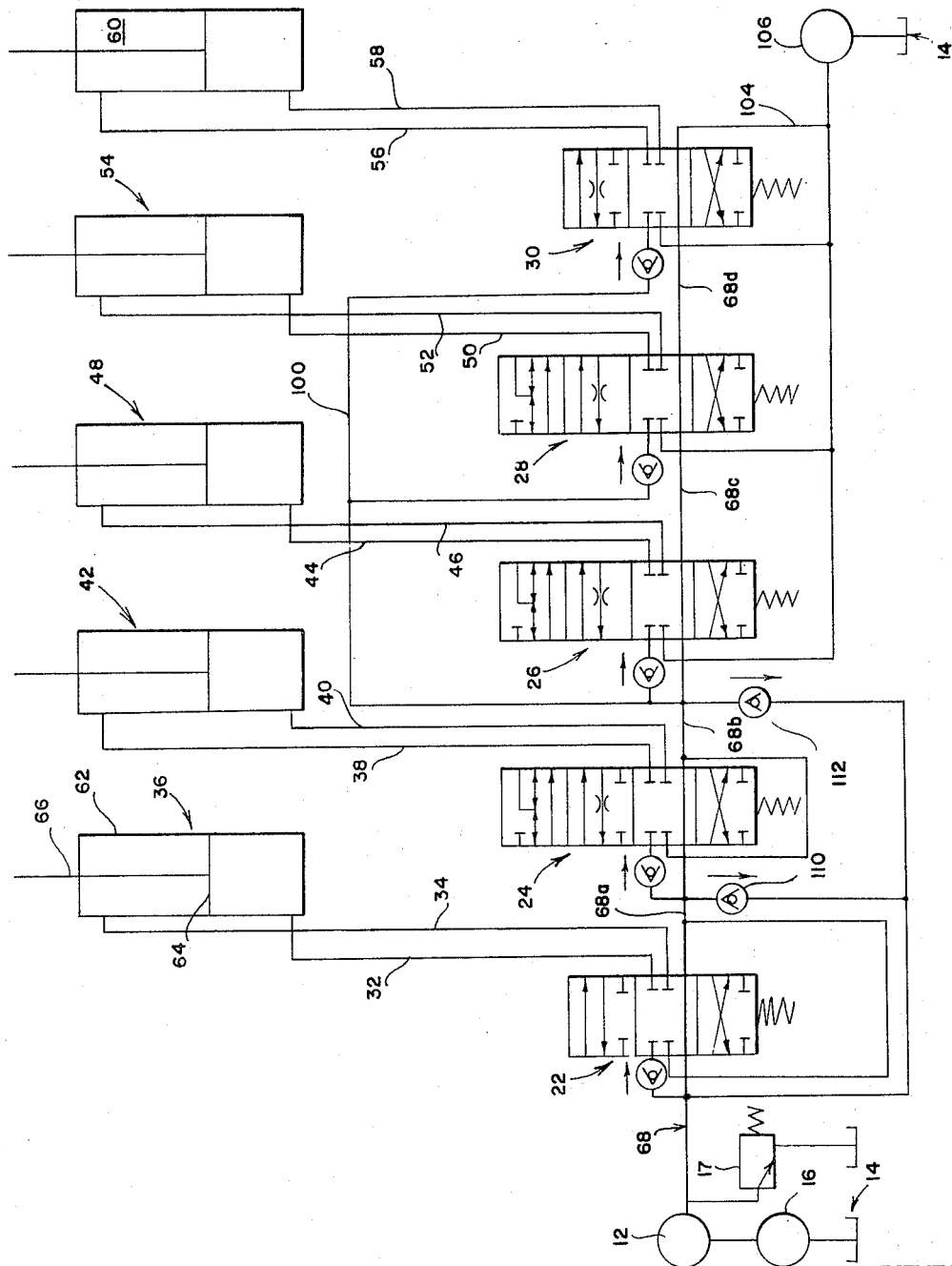

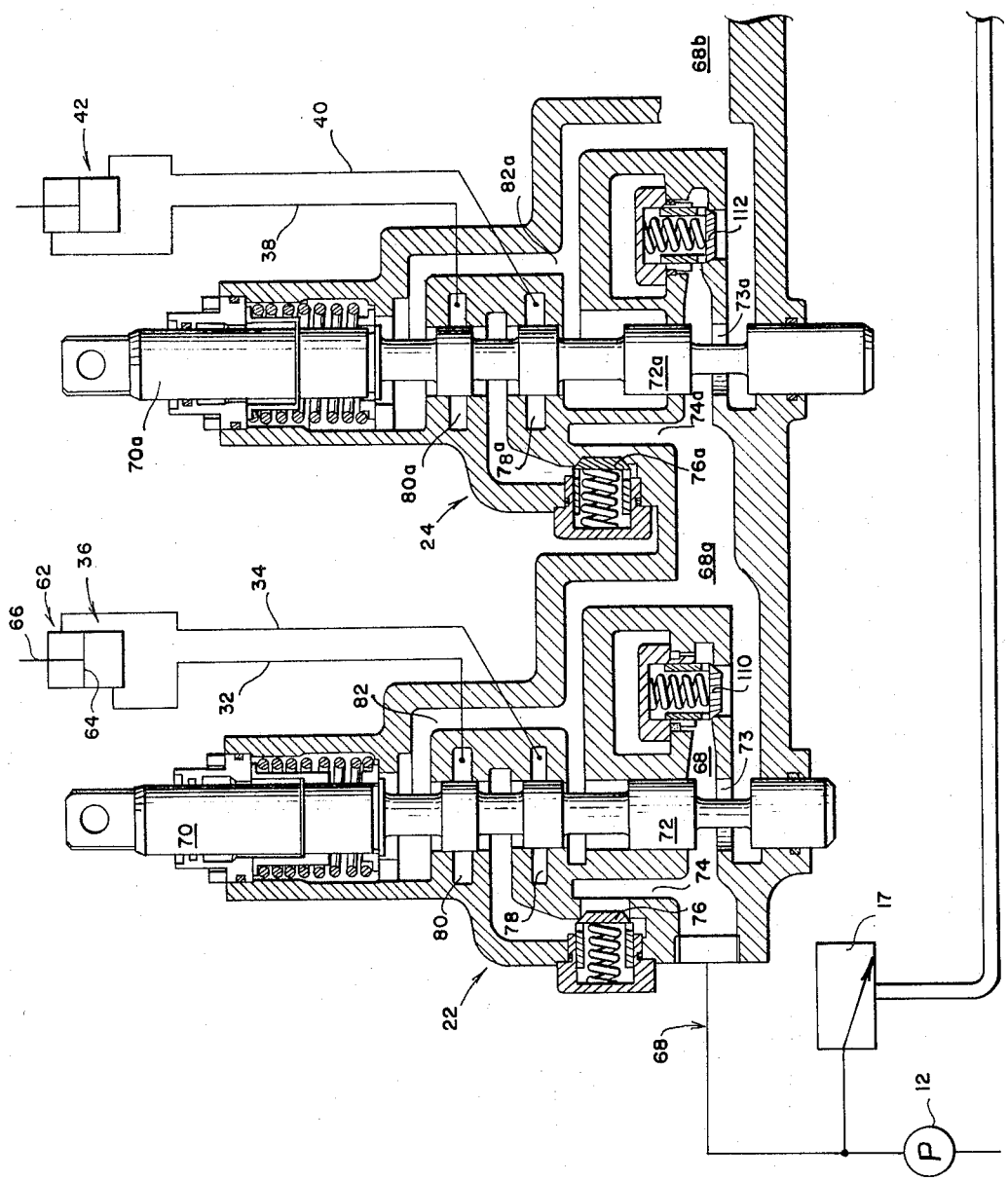

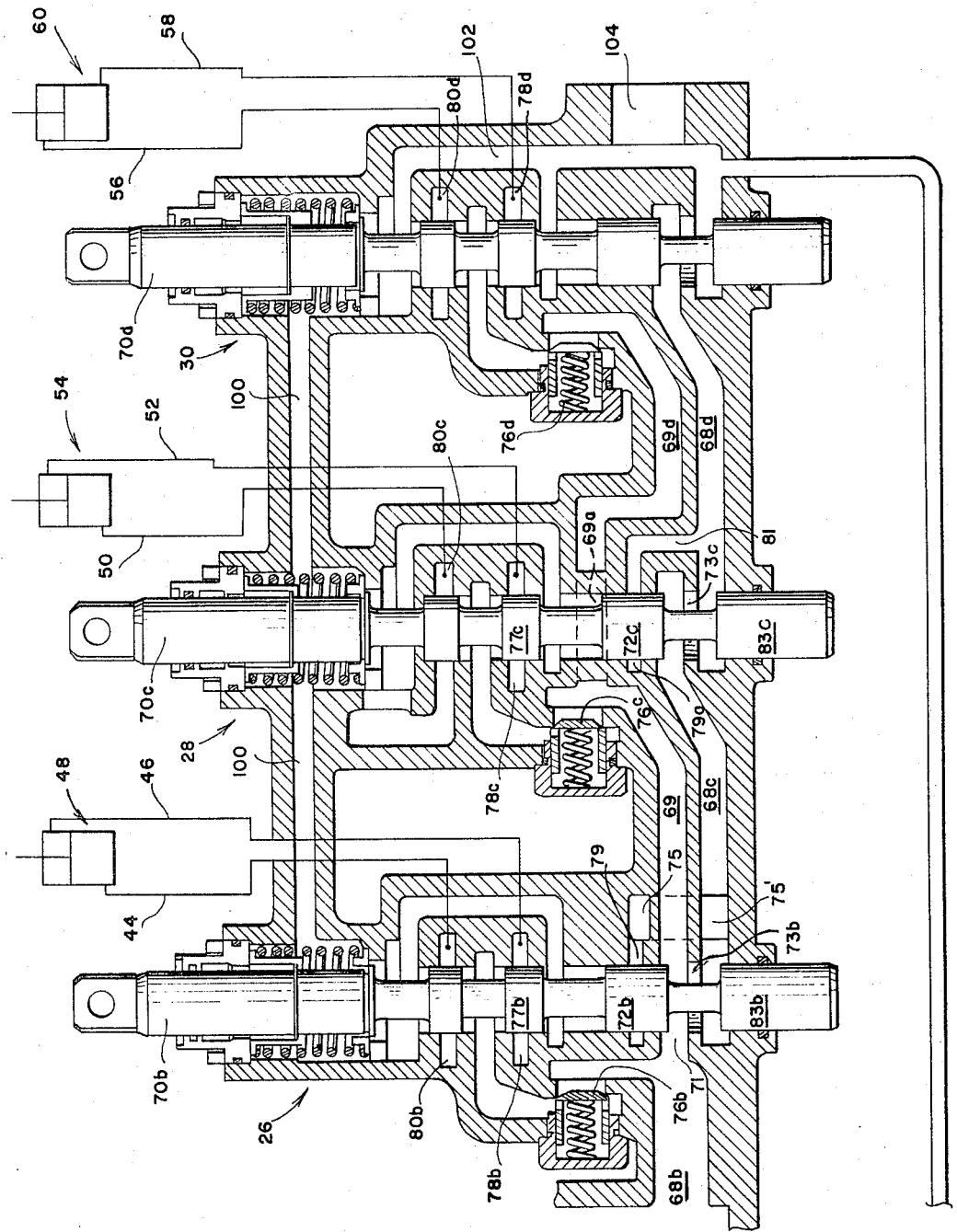

3,303,753
PRESSURE LIQUID CONTROL SYSTEM
Frank V. McCay, Jr., Salt Lake City, Utah, assignor to The Eimco Corporation, Salt Lake City, Utah, a corporation of Delaware
Filed June 18, 1965, Ser. No. 464,955
2 Claims. (Cl. 91—414)

This invention relates to improvements in pressure liquid control systems and in particular to a system including a single source of pressure liquid connected to a plurality of pressure liquid actuated motion devices through a plurality of pressure liquid control valves.

A particular object of the present invention is to provide in a hydraulic system having serially connected valves and motion devices, pressure liquid relief valve means which prevent damage to the valves and other parts of the system in the event of a pressure buildup within the system.

These and other objects and advantages are provided in a pressure liquid control system comprising a source of pressure liquid; a first set of pressure liquid actuated motion devices; a second set of pressure liquid actuated motion devices; separate valve means for each of the first set of motion devices; separate valves for each of said second set of motion devices; first conduit means serially interconnecting the source of pressure liquid, the separate valve means and the first set of motion devices; second conduit means connecting pressure liquid from the last in series of the separate valve means and each of the separate valves; and further conduits connecting in parallel the second set of motion devices and the separate valves.

The invention will be more particularly described in reference to the accompanying drawings which are offered by way of example only and not in limitation of the invention, the scope of which is defined by the appended claims.

FIG. 1 is a diagrammatic view of a system embodying the present invention.

FIG. 2 is an enlarged fragmentary sectional view of the first and second of the valves illustrated in FIG. 1;

FIG. 3 is an enlarged fragmentary view of the last three valves generally illustrated in FIG. 1.

Referring to the drawing, the system includes a pump 12 connected to a source of pressure liquid 14 through a conventional filter 16.

Control valve 22 is connected by pressure fluid lines 32 and 34 to a motion device 36. Valve 24 is connected by pressure fluid lines 38 and 40 to motion device 42. Valve 26 is connected by pressure fluid lines 44 and 46 to motion device 48. Valve 28 is connected by lines 50 and 52 to motion device 54 and valve 30 is connected to motion device 60 by pressure fluid lines 56 and 58.

Each of the motion devices 36, 42, 48, 54 and 60 are illustrated as double acting pressure fluid rams and as shown on motion device 36 includes a cylinder 62, a piston 64, and a piston rod 66.

By way of example, motion devices 36, 42 and 48 may control an ejector, a bowl and an apron on a scraper towed by a bulldozer, while motion devices 54 and 60 may control the blade lift and blade tilt of a blade carried on the front of the same bulldozer.

Referring particularly to FIG. 2, pressure fluid from the pump 12 is directed to valve 22 via conduit 68 and, in the illustrated position of spool 70 of this valve, the flow of pressure liquid continues to valve 24 through passage 68a. However, if the spool 70 is depressed so that land 72 blocks the passage 73 between conduit 68 and passage 68a pressure fluid then flows through passage 74, unseating check valve 76, into valve groove 78, thence to conduit 34 and to the upper side of the ram piston 64. Fluid below the piston 64 is discharged through conduit 32 into valve groove 80, thence through valve passage 82 and into valve passage 68a. Thus, the return flow from motion device 36 supplies the pressure fluid for the second valve 24 which is connected in series with valve 22 and motion device 36 through passage 68a.

If valve 24 is not actuated, the pressure fluid from passage 68a flows through passage 73a directly to passage 68b thence to valve 26. However, if spool 70a, of valve 24, is depressed, fluid flows through passage 68a and check valve 76a, to valve groove 78a to pressure fluid line 40 and then to the lower end of motion device 42.

Fluid displaced at the upper end of motion device 42 flows through conduit 38 to valve groove 80a, thence through passage 82a, to passage 68b, to provide the pressure fluid for succeeding valve 26.

As shown in FIG. 3, if valve 26 is not actuated, pressure fluid flows into passages 69 and 68c leading to subsequent valves 28 and 30. However, if the valve spool 70b of valve 26 is depressed, so that land 72b blocks passage 73b and prevents the flow of pressure liquid into passage 68c, fluid from incoming passage 68b flows upwardly through check valve 76b, thence through valve groove 78b into line 46 and to the upper end of motion device 48. The fluid displaced from the lower end of the motion device 48 flows through conduit 44 to valve groove 80b, thence about the spool to a common exhaust passage 100 surrounding the upper ends of valves 26, 28 and 30. Eventually the displaced fluid from passage 100 flows through passage 102 to the exhaust line 104 through the filter 16, FIG. 1, and into the sump 14.

It should be noted that even though spool 70b is depressed to effect actuation of motion device 48, pressure fluid continues to be available to subsequent valves 28 and 30 through an unobstructed enlarged area 71, surrounding the base of the spool 70b, passages 69, 69a (dotted lines) and 69d, all of which are continuously supplied with pressured fluid through passage 71.

If spool 70b is urged upwardly so that land 77b blocks the flow of pressure fluid to each groove 80b and 78b, while land 83b blocks the passage 73b pressure fluid may then flow from area 71 to groove 79 into inlet 75 of passage 75'. Passage 75' discharges fluid into passage 68c.

Groove 79, and passage 75' prevent blockage of high pressure fluid in passages 69, and 69d when valve spool 70b of valve 26 is in a position wherein normal flow of fluid to passage 68c is blocked and no portion of the pressure fluid is being utilized by its connected motion device.

Similarly valve groove 79a, and passage 81 of valve 28 perform the same function when land 77c is moved to a position to block the flow of pressure fluid to grooves 78c and 80c while land 83c is blocking passage 73c. As previously indicated, valve 26 is supplied with fluid whenever both valves 22 and 24 are neutral or when at least one of the motion devices served thereby is displacing fluid into passage 68b.

If the valves 22 and 24 are in their illustrated positions or if they are directing fluid to their respective motion devices and there is fluid discharging from said motion devices then any or all of valve spools 70b, 70c or 70d may be operated in any combination. If valve 28 is operated by urging the spool 70c downwardly, pressure fluid in passage 69 flows through the check valve 76c into and through groove 78c, thence through conduit 52 to the upper end of motion device 54. Return fluid from the lower end of the motion device flows through conduit 50 to valve chamber 80c thence into the common exhaust passage 100.

Whenever the spool 70c is depressed, fluid flow through passage 68c to exhaust passage 68d is blocked. However, fluid can still flow to valve 30 through passage 69d which, as shown in dotted lines, by-passes the spool 70c. In this connection, it will also be noted that there is at least continuous unobstructed communication between passage 68b leading to valve 26 and passage 69 and 69d leading to valves 28 and 30 through the enlarged area 71 surrounding the base of spool 70b in valve 26 and the cross connection 69a shown in dotted lines in valve 28. The enlarged zone insures that passage 69 is in constant communication with pressured fluid from passage 68b while the cross connection 75′ insures communication between passages 69 and 68c when spool 70b is pulled upwardly to the full float position where passage 68c would otherwise be blocked by the bottom land 83b as hereinbefore discussed. Thus, valves 26, 28 and 30 are in parallel with each other and can all be operated simultaneously.

In the foregoing discussion generally only one direction of motion of the motion devices has been described. However, it will be apparent that by urging the valve spools 70, 70a, 70b, 70c or 70d upwardly instead of downwardly, pressure fluid can be directed to grooves 80a, 80b, 80c and 80d and return fluid to grooves 78a, 78b, 78c and/or 78d, respectively.

If valve 22 is moved to an operative position it initiates movement of motion device 36. Pressure fluid displaced from the cylinder 62 of the motion device passes back through valve 22 and thence onto valve 24, etc. Ignoring the "intensifier" effect due to the volume occupied by the piston rod, if energy is used in motion device 36 the pressure on the fluid reporting to the next valve 24 is correspondingly reduced. For example, if the system pump 12 delivers fluid to valve 22 at 2,000 p.s.i. for actuation of piston 64, and if the spool 70 is moved upwardly to direct fluid to the bottom of the piston and the existing load requires 500 p.s.i. there will then be delivered to valve 24 pressure fluid at 1,500 p.s.i. for use in actuating its motion device 42. In other words, with the series connection of valves 22, 24 and 26 the addition of pressures within the system is algebraic; and if the motion device 36 contributes energy to the pressure fluid rather than using it—as might occur if actuation of the valve merely opens flow to permit the hydraulic ram to lower a heavy load—then the pressure supplied to valve 24 would be the sum of the pump pressure and whatever pressure is added to the system by the downward movement of the piston 64 supporting the load. This pressure could also be increased by the intensifier or transformer effect.

Intensifier or transformer effect arises due to unequal areas on opposite faces of pistons in double acting pressure fluid rams. The unequal areas are caused by the area of the piston rod which is subtracted from the total area of its face of the piston. For example, if motion device 48 comprises a cylinder having an internal diameter of six inches and the piston rod has a diameter of two inches then the effective areas on opposite sides of the piston would be about 28.27 sq. inches and about 25.13 sq. inches, and the difference in effective areas would be 3.14 sq. inches. This difference in area can result, under certain circumstances, in a substantial increase (ignoring load conditions, etc.) in the pressure discharging, through conduit 34, over the pressure directed to the lower end of cylinder 62 through conduit 32. Under the right conditions pressure increases in such systems due to the above described intensifier effect together with increases in pressure due to lowering of a heavy load can result in the existence of dangerous pressure loads existing in the system.

So long as the valves are positioned to permit fluid through the system such additive pressures create no problem. However if the flow is blocked, the added pressure can create a serious problem.

Assume a system in which system pressure from the pump is 2,000 p.s.i. and the first motion device 36 requires only 500 p.s.i. Under these conditions fluid displaced from the first motion device 36 is at 1500 p.s.i. and this pressure reports to the second motion device 42 if valve 24 is in the open position. If the load on the second motion device 42 instead of using energy, contributes 1,200 p.s.i. to the system then the pressure of fluid discharged from the motion device 42 would be the sum of the pump pressure, 2000 pounds, less than 500 p.s.i. used in the first motion device 36, plus the 1,200 p.s.i. generated in the second motion device 42. The resultant total of 2,700 p.s.i. is available at the discharge of motion device 42 for supply through subsequent valve 26. If at this pressure motion device 48 is actuated by valve 26 and the valve remains open after the motion device 48 reaches the limit of its travel there would be a total of 2700 p.s.i. pressure trapped in the system. Such a pressure creates an explosive situation in the valve or in its pressure fluid lines; and to prevent this a pair of relief valves 110 and 112 is placed in the system. These valves together with relief valve 17 and cross flow passages 75′ in valve 26 and passage 81 in valve 28, prevent pressure in passages 68a, 68b, 69 and 69d and other communication passage from exceeding the inlet pressure of conduit 68 as determined by the system relief valve 17. The valves 110 and 112 operate to vent excess pressure into the passages 68a and 68b leading back to the conduit 68 and system relief valve 17.

In the illustrated embodiment the valves 22, 24 and 26 are in series while valves 26, 28 and 30 are in parallel with each other. Thus it may be said that valves 22, 24 and the parallel system comprising valves 26, 28 and 30 are in series. It will be appreciated that the number of serially arranged valves and the number of valves arranged in parallel may be increased or decreased without departing from the scope of this invention and without modifying its operating principle. Further, the motion devices illustrated as hydraulic rams may comprise rotary fluid motors and the like.

What is claimed is:

1. A pressure liquid control system comprising a source of pressure liquid; first and second sets of flow control valves; a flow control spool operatively associated with each of the flow control valves; conduit means serially connecting the source of pressure liquid and each of the first set of flow control valves under control of the flow control spools thereof, and connecting each of the second set of flow control valves in parallel with each other and in series with the first set of flow control valves; first and second sets of motion devices; pressure fluid and return lines connecting each motion device of the first and second sets of motion devices with their respective first and second flow control valve under control of the flow control spools thereof; passage means in each of the first set of valves cooperating with means on their respective flow control spool for selectively directing all of the pressure liquid from the conduit means to their motion device and from their motion device to the next in the series of the flow control valves; passage means in each of the second set of valves cooperating with means on their respective flow control spool for selectively directing pressure liquid from the conduit means to their respective motion device and from their motion device to exhaust, and pressure liquid relief valves in said passage means for each of the first set of valves.

2. The system defined in claim 1 including by-pass passage means in each of the passage means of each of the second set of valves.

References Cited by the Examiner

UNITED STATES PATENTS

| | | | |
|---|---|---|---|
| 2,112,466 | 3/1938 | Maloon | 60—52 |
| 2,247,140 | 6/1941 | Twyman | 91—414 |
| 2,800,969 | 7/1957 | Ziegler | 91—414 X |

EDGAR W. GEOGHEGAN, *Primary Examiner.*